(12) United States Patent
Peura et al.

(10) Patent No.: US 9,616,746 B2
(45) Date of Patent: Apr. 11, 2017

(54) POWER TRANSFER UNIT STRADDLE MOUNT RING GEAR DISCONNECT

(71) Applicant: GKN Driveline North America, Inc., Auburn Hills, MI (US)

(72) Inventors: Brent Peura, Farmington, MI (US); Kazunobu Takeshita, West Bloomfield, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 0 days.

(21) Appl. No.: 15/142,291

(22) Filed: Apr. 29, 2016

(65) Prior Publication Data

US 2016/0243937 A1 Aug. 25, 2016

Related U.S. Application Data

(62) Division of application No. 13/920,050, filed on Jun. 17, 2013, now Pat. No. 9,341,238.

(60) Provisional application No. 61/660,658, filed on Jun. 15, 2012.

(51) Int. Cl.

| F16H 3/08 | (2006.01) |
|---|---|
| B60K 17/346 | (2006.01) |
| F16H 1/12 | (2006.01) |
| F16H 1/14 | (2006.01) |
| B60K 17/02 | (2006.01) |
| B60K 17/344 | (2006.01) |
| B60K 23/08 | (2006.01) |
| F16D 11/14 | (2006.01) |

(52) U.S. Cl.
CPC ............ *B60K 17/346* (2013.01); *B60K 17/02* (2013.01); *B60K 17/344* (2013.01); *B60K 23/08* (2013.01); *F16D 11/14* (2013.01); *F16H 1/12* (2013.01); *F16H 1/14* (2013.01); *F16H 1/145* (2013.01); *Y10T 74/19614* (2015.01)

(58) Field of Classification Search
CPC .. B60K 17/02; B60K 17/344; B60K 17/3515; B60K 23/08; F16H 2048/385; F16H 1/12; F16H 48/24
See application file for complete search history.

(56) References Cited

U.S. PATENT DOCUMENTS

| 4,739,678 | A | 4/1988 | Miura et al. |
|---|---|---|---|
| 5,234,955 | A | 8/1993 | Ray et al. |
| 5,409,000 | A | 4/1995 | Imran |
| 5,584,786 | A | 12/1996 | Almeda |
| 5,890,989 | A | 4/1999 | Yamazaki et al. |
| 2002/0033062 | A1 | 3/2002 | Obinata |
| 2008/0230295 | A1 | 9/2008 | Grogg |

(Continued)

*Primary Examiner* — William Kelleher
*Assistant Examiner* — Jake Cook
(74) *Attorney, Agent, or Firm* — Jennifer M. Brumbaugh; Reising Ethington P.C.

(57) ABSTRACT

A gear assembly includes an input shaft, a drive ring gear assembly, a pair of input/ring bearings, a driven pinion gear assembly, a first and second clutch members, and an actuator assembly. The first cutch member is fixedly connected to the input shaft. The drive ring gear assembly is mounted about the input shaft. The input/ring bearings are mounted so as to straddle the drive ring gear. The driven pinion gear assembly is operatively engaged with the drive ring gear. The second clutch member is slidingly mounted to the drive ring gear and the actuator assembly operates to move the second clutch member into engagement with the first clutch member to cause the drive ring gear to rotate when the input shaft rotates.

5 Claims, 6 Drawing Sheets

(56) References Cited

U.S. PATENT DOCUMENTS

2010/0058890 A1 3/2010 Palazzolo et al.
2012/0234120 A1 9/2012 Fukuda et al.
2012/0238388 A1 9/2012 Fusegi et al.

POWER TRANSFER UNIT STRADDLE MOUNT RING GEAR DISCONNECT

REFERENCE TO RELATED APPLICATIONS

This is a divisional of U.S. patent application Ser. No. 13/920,050 filed Jun. 17, 2013, which claims priority to and the benefit of U.S. Provisional Application Ser. No. 61/660,658 filed on Jun. 15, 2012, the entire contents of which are incorporated herein by reference.

TECHNICAL FIELD

The present disclosure relates generally to power transfer units, and more specifically to a power transfer unit having a disconnect mechanism for disengaging rotating components.

BACKGROUND

Fuel efficiency and component package envelopes are becoming a driving force in the design of vehicle drivelines. Specifically, designers are challenged by the need to provide the all-wheel drive capabilities of larger sport utility vehicles (SUVs) in smaller more compact vehicles to achieve better fuel efficiency while maintaining traction capabilities. Motor vehicles may be driven by a transmission that transmits rotational torque from a power head, such as an engine, to a power transfer unit (also known as a power take-off unit) through a torque-transmitting shaft. The power transfer unit ultimately drives a plurality of axles that can be divided into those with a hang-on four-wheel drive, wherein a primary axle is driven permanently and a secondary axle is connected, if required, and those with a permanent four-wheel drive or all-wheel drive, wherein all axles are driven permanently as drive torque is split between all wheels. The design of the driveline is largely influenced by the arrangement of the engine in the motor vehicle, i.e. whether it is arranged in the front or at the rear and whether it is positioned in the longitudinal or transverse direction. At the same time, stringent packaging requirements exist regarding size, weight, and assembly costs of such systems.

Power transfer units are commonly utilized in front-wheel drive based all-wheel drive systems. A power transfer unit transmits the torque from the transmission to a propshaft, which in turn delivers power to the rear wheels. Most power transfer units are always in a ready state, commonly controlled by a slipping clutch near the rear axle, and yet are utilized only a small fraction of the time during driving. However, in this "ready state," the existing power transfer units exhibit a full time drain to fuel efficiency with only a part-time benefit to traction.

In typical four-wheel or all-wheel drive based layouts, the power transfer unit is always rotating when the vehicle is in motion, creating energy losses due to gear mesh, rotating inertias, bearing drag, as well as oil churning. These losses reduce the fuel economy and may create premature wear on the rotating assembly. Additionally, typical power transfer units are bulky and include rotating components that were originally configured for larger vehicles, which prohibit interchangeability in smaller motor vehicles. Thus, there exists a need for a power transfer unit that minimizes the energy losses to increase fuel efficiency while maintaining a small package envelope for use in various motor vehicle platforms.

In some power transfer arrangements, a cantilever arrangement has been proposed with a side mounted ring gear to provide a disconnection mechanism that disconnects the input drive shaft from the ring gear when not needed to transfer torque. In this arrangement, the disconnect feature is positioned on an opposite side of bearings and sealing features than that of the ring gear (coaxial to the ring gear, but in front of or behind the ring gear). While this arrangement, as compared to power transfer units that do not have a disconnection unit, reduces parasitic losses, the size of the ring gear is constrained, also causing additional packaging issues. Moreover, additional seals are required to effectively seal the power transfer unit, adding further cost to the assembly.

SUMMARY

In a first exemplary arrangement, a gear assembly for a power transfer unit is disclosed. The gear assembly includes an input shaft, a drive ring gear assembly, a pair of input/ring bearings, a driven pinion gear assembly, a first and second clutch members, and an actuator assembly. The first cutch member is fixedly connected to the input shaft. The drive ring gear assembly is mounted about the input shaft. The input/ring bearings are mounted so as to straddle the drive ring gear. The driven pinion gear assembly is operatively engaged with the drive ring gear. The second clutch member is slidingly mounted to the drive ring gear and the actuator assembly operates to move the second clutch member into engagement with the first clutch member to cause the drive ring gear to rotate when the input shaft rotates. The clutch members may be dog clutch members, or sliding spline clutch members.

Another exemplary gear assembly for a power transfer unit assembly includes an input shaft, a drive ring gear assembly, a pair of input/ring bearings, first and second clutch members, a driven pinion gear assembly, and an actuator assembly. In this arrangement, the input/ring bearings are straddle mounted on either side of the drive ring gear. The first clutch member is fixedly connected to the input shaft and is configured to be disposed between the input/ring bearings. The second clutch member is fixedly mounted to the drive ring gear. The driven pinion gear assembly is operatively engaged with the drive ring gear. The actuator assembly operates to move the first clutch member into engagement with the second clutch member by moving the input shaft axially so as to cause the drive ring gear to rotate with the input shaft, thereby causing the driven pinion gear assembly to rotate.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are exemplary and are not intended to be exhaustive or otherwise limit or restrict the claims to the precise forms and configurations shown in the drawings and disclosed in the following detailed description.

DETAILED DESCRIPTION OF PREFERRED EMBODIMENTS

Figure 1:
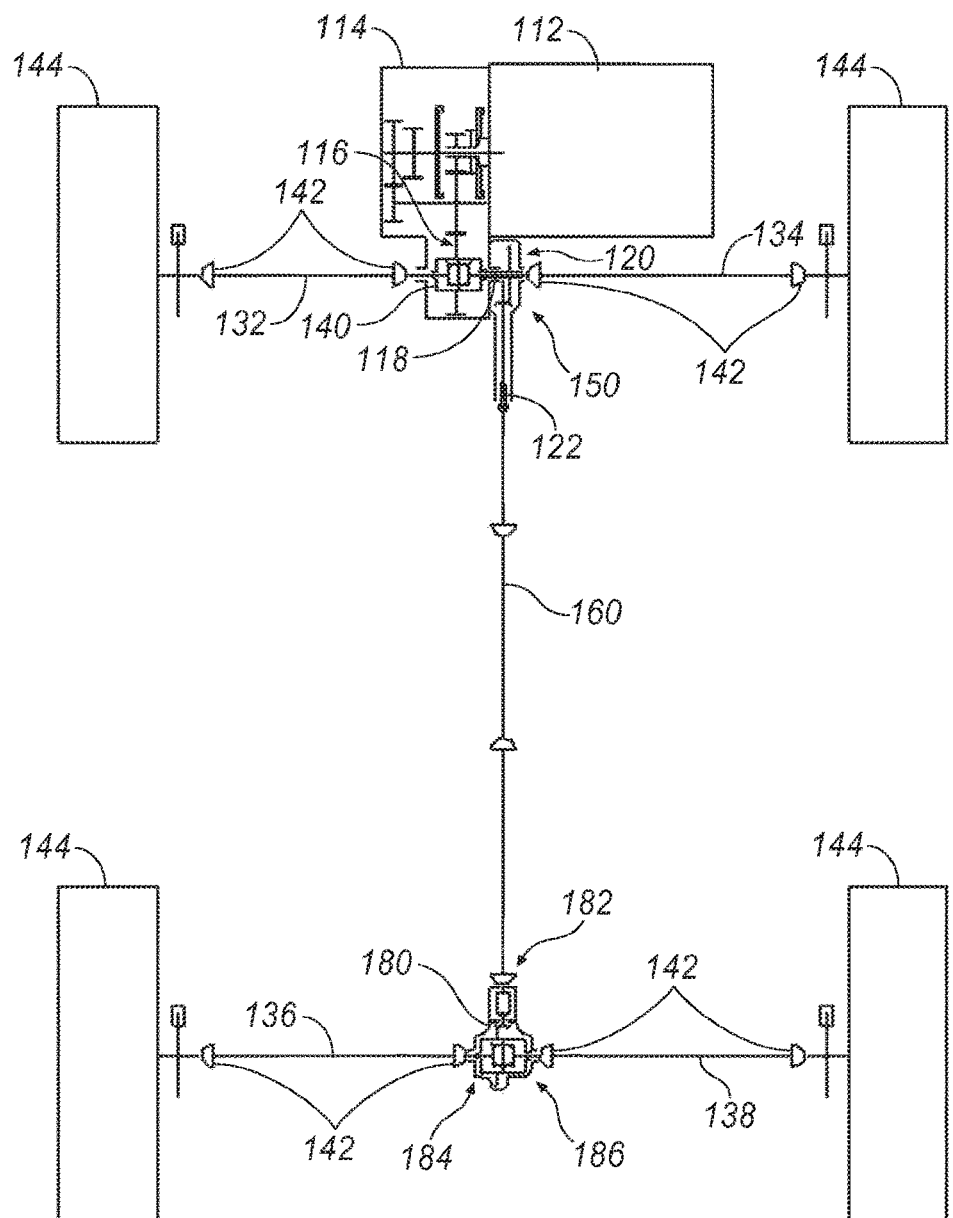
FIG. 1 is a schematic illustration of a top view of a vehicle drivetrain having an exemplary primary power transfer unit and an exemplary secondary power transfer unit according to one exemplary arrangement.
Figure 3:
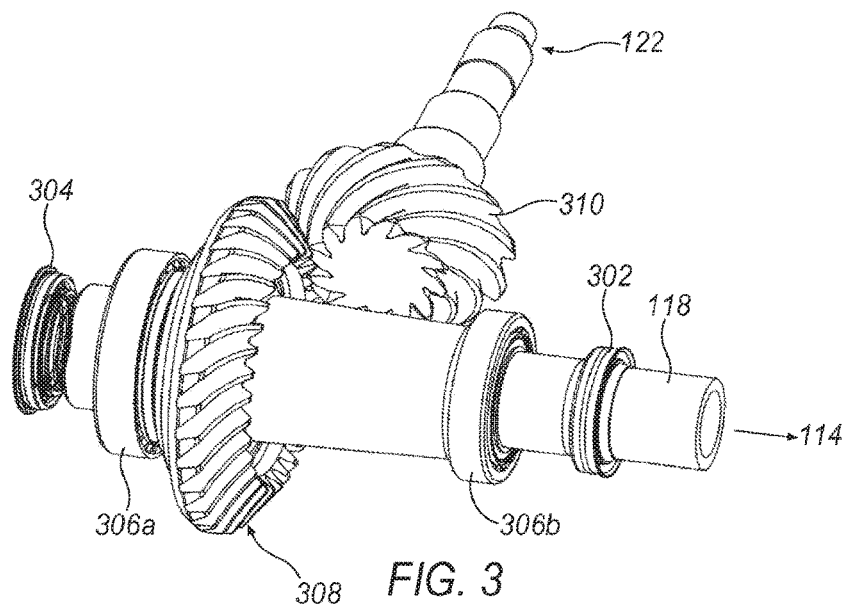
FIG. 3 is a perspective view of components of a power transfer unit with a straddle mount ring gear.

Referring now to FIG. 1, an exemplary vehicle drivetrain assembly 100 is illustrated. The vehicle drivetrain assembly 100 has a transversely mounted engine 112 and transmission 114. The vehicle drivetrain assembly 100 may include a plurality of shaft elements 132, 134, 136, 138 and corresponding articulating torque transfer joints, which are illustrated as a constant velocity joints 142. However, other types of joints may be used, such as, but not limited to universal, tripod, cardan, double cardan and plunging constant velocity joints. The shaft elements 132, 134, 136, 138 and joints 142 may be used to transmit torque from both a primary power transfer unit (PTU) 150 and the transmission 114 to a plurality of wheels 144. Generally, the engine 112 may be affixed to the transmission 114 through an engine crankshaft (not shown) that is fixed to a transmission input shaft (not shown) to provide torque to the transmission 114. The torque may be transmitted through a series of gears (not shown), within the transmission 114, and ultimately to a transmission output shaft 116 that may be at a parallel offset from the transmission input shaft. At the transmission output, the transmission 114 may be affixed directly to the PTU 150 or a differential 140 may be utilized between the transmission 114 and the PTU 150, depending on the position of the transmission 114. The PTU 150 may be rotatively connected to the transmission output shaft 116 through an input shaft 118 (best seen in FIG. 3). The first shaft 132 is generally configured extending from the transmission 114, which may include the differential 140 or it may be positioned within the input shaft 118 to extend exteriorly from one end of the PTU 150, and a second shaft 134 may extend from an opposite end at a front output side 120 of the power transfer unit 150. Additionally, the primary PTU 150 may include an output 122 to transmit torque to a secondary PTU 180 to drive the wheels 144 through a propeller shaft 160.

For exemplary purposes, the vehicle drivetrain assembly 100 is illustrated with a front wheel drive configuration whereby the primary PTU 150 may include an output 122 to transmit torque to the secondary PTU or rear drive unit (RDU) 180. It is understood that vehicle drivetrain assembly 100 is not limited to a front wheel drive configuration. Any discussion with respect to the configuration vehicle drivetrain assembly 100 is merely exemplary and non-limiting.

Turning back to FIG. 1, the RDU 180 may be configured similarly to the PTU 150 including an input 182, a first output 184 configured to transmit torque to a wheel 144 through a first rear shaft 136, and a second output 186 configured to transmit torque to a wheel 144 through a second rear shaft 138.

Figure 2:
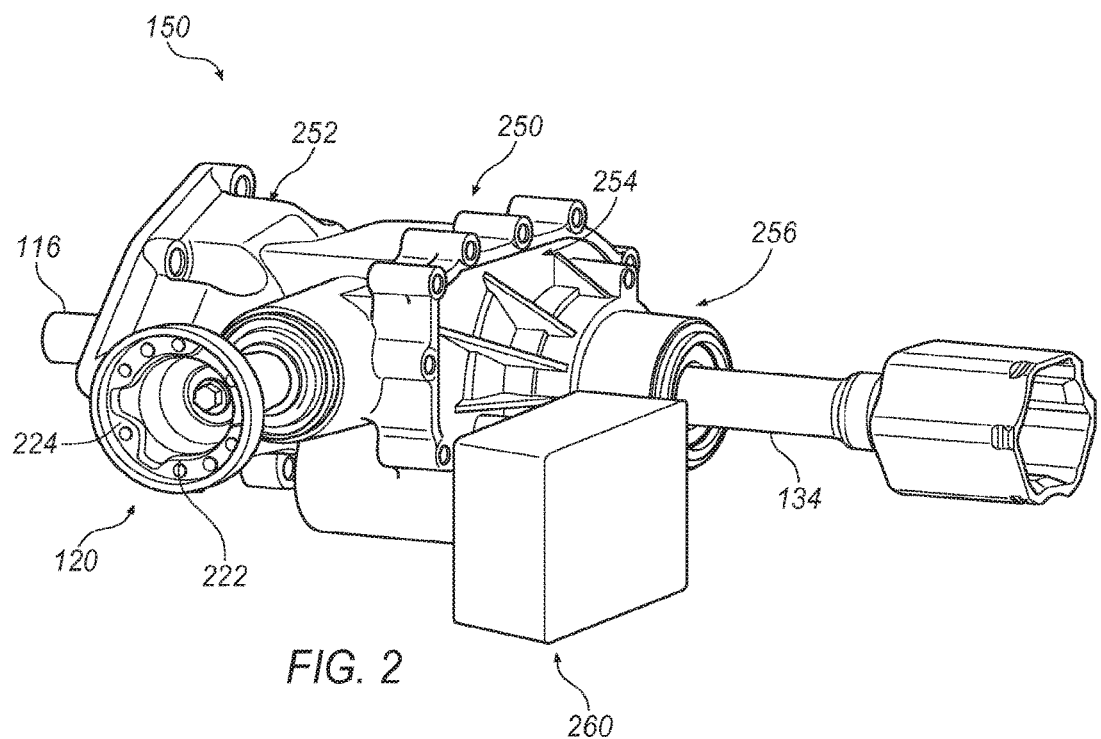
FIG. 2 is a perspective view of an exemplary power transfer unit assembly.

Referring to FIG. 2, an exemplary PTU 150 is illustrated. The PTU 150 may include a housing 250 having a housing component 252 and a cover 254. However, it should be known that the housing 250 may be sectioned into multiple pieces and is not limited to the exemplary two-piece configuration of the housing component 252 and the cover 254 depicted in FIG. 2. The housing 250 may be constructed from rigid materials, such as, but not limited to aluminum, steel, iron, carbon fiber or other known composites and metal matrices. The exemplary housing component 252 is configured to be rotatively fixed and connected to the transmission 114 housing, while the cover 254 is configured as a cantilevered ring gear cartridge assembly 256 that is affixed to the housing component 252. The cover 254 may include an actuator 260 that is assembled with the ring gear cartridge assembly 256. The exterior surfaces of the housing 250 are configured to provide minimal clearance between the PTU 150 and the engine 112, thereby creating a tight driveline package envelope. The minimal clearance is a result of the existing engine and transmission layouts.

The PTU 150 further includes an output shaft 222 having a connection element 224, such as, but not limited to a yoke, propshaft flange connection or other driveline connection element. The connection element 224 is configured to rotatively connect the propeller shaft 160 directly to the PTU 150 for transmitting torque to the RDU 180.

Referring to FIGS. 3-7, various components of the PTU 150 will now be described in further detail. As described above, the PTU 150 includes the input shaft 118 which rotationally connects to the transmission 114. Input shaft 118 may further be provided with dynamic lip seals 302, 304 on either end thereof that operate to seal input shaft 118 to housing component 252 and cover 254. In contrast to other PTU disconnect arrangements; input/ring bearings 306a and 306b are straddle mounted on either side of a drive ring gear 308. While input/ring bearings 306a, 306b are illustrated as tapered bearings, it is understood that other suitable bearings may be utilized, such as, for example, angular contact bearings.

Figure 7:
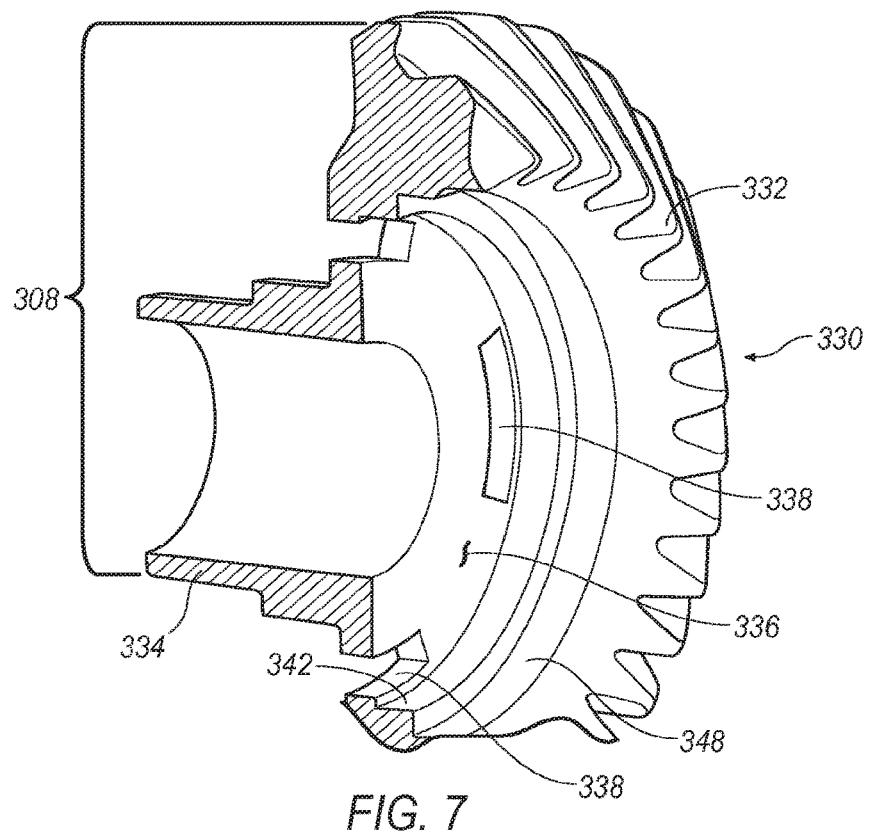
FIG. 7 is a partial cross-sectional perspective view of a ring gear from the power transfer unit of FIG. 3.

Details of the drive ring gear 308 are illustrated in FIG. 7. Ring gear 308 includes a gear face portion 330 that includes a plurality of teeth 332 formed on a first end thereof. A second end of drive ring gear 308 includes a shaft end 334. In one exemplary configuration, shaft end 334 is stepped. Formed within an inside face 336 of drive ring gear 308 are a plurality of dog clutch windows 338 through which a portion of a dog clutch 340 (best seen in FIGS. 8A-8D) may be received. A spring groove 342 is formed within an inside portion of drive ring gear 308. Spring groove 342 receives a return spring 341 (best seen in FIGS. 4 and 5). Further, while drive ring gear 308 is illustrated as a 90° hypoid gear, it is understood that other suitable gears may be employed. Such examples include, but not limited to bevel gears, beveloid, helical and spiral bevel gears.

PTU 150 further includes a driven pinion gear 310 that operatively engages with drive ring gear 308. Driven pinion gear 310 is fixedly connected to output 122. As set forth above, output 122 serves to transmit torque to a secondary PTU or rear drive unit (RDU) 180 to drive the rear wheels 144 through the propeller shaft 160. While driven pinion gear 310 is illustrated as a 90° hypoid gear, it is understood that other suitable gear mechanisms may also be employed. Examples include, but are not limited to, bevel, beveloid, helical or spiral bevel arrangements.

Figure 5:
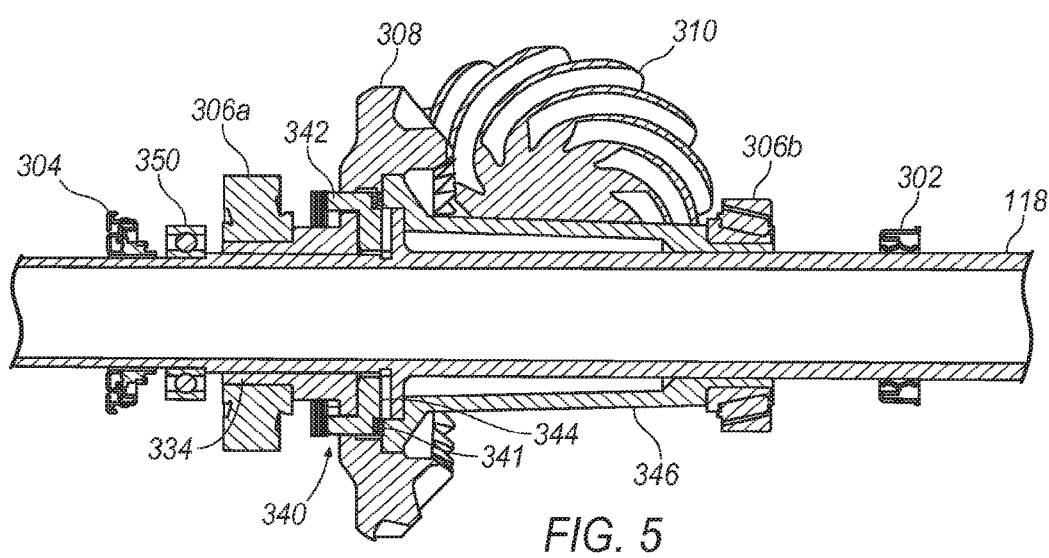
FIG. 5 is a side elevational view of the components of the power transfer unit with the straddle mount ring gear of FIG. 3 in a disconnected mode.
Figure 6:
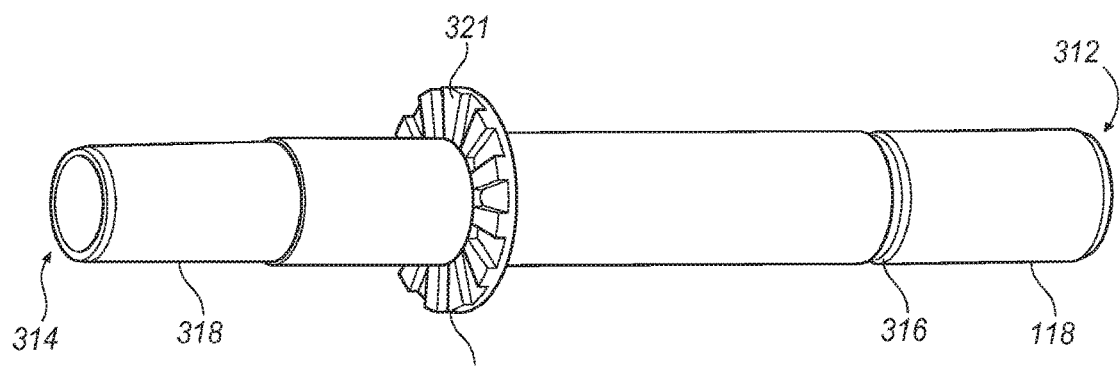
FIG. 6 is a perspective view of an input shaft with a dog clutch face spline.

Details of an exemplary input shaft 118 may be seen in FIG. 6. Input shaft 118 may be configured to be hollow, but generally defines a first end 312 and a second end 314. First end may be formed with a spline (not shown) to permit connection to the transmission 114. A sealing groove 316 may be provided to receive a sealing member (not shown) or to provide for engagement of a lip seal 302 (see FIGS. 4 and 5). Second end 314 may be configured with a reduced diameter section 318. A dog clutch thrust face spline 320 is mounted about input shaft 118. In one exemplary configuration, the dog clutch thrust face spline 320 is integrally formed with the input shaft 118 so as to be rotationally fixed with the input shaft. However, other manners of rotationally fixing the dog clutch thrust face spline 320 to the input shaft 118 are also contemplated. Dog clutch thrust face spline 320 is configured with a plurality of splines 321 that are configured to mate with corresponding splines formed on an outer engaging face 344 of dog clutch 340 such that, when dog clutch 340 is engaged with dog clutch thrust face spline 320, dog clutch 340 will rotate with input shaft 118.

Figure 8A:
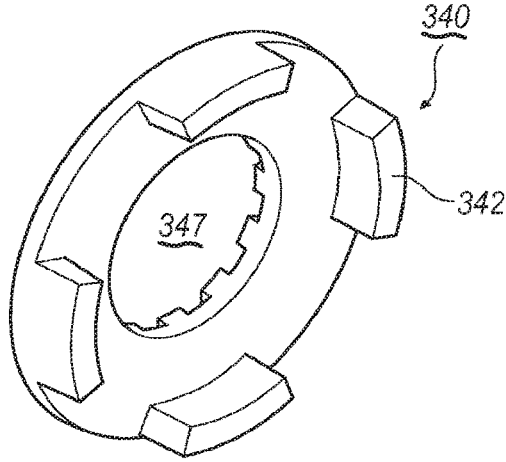
FIG. 8A is a first perspective view of a dog clutch from the power transfer unit of FIG. 3
Figure 8B:
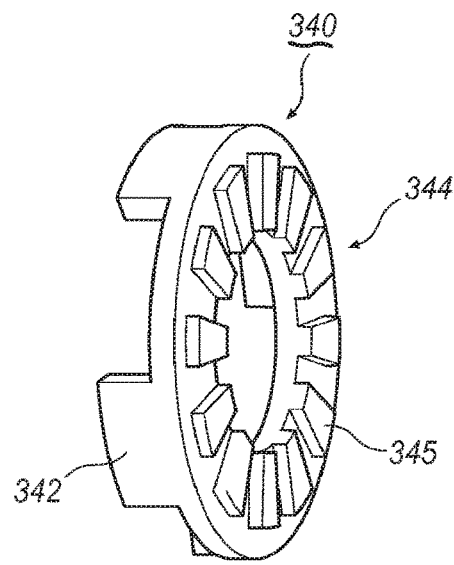
FIG. 8B is a second perspective view of the dog clutch from FIG. 8A.
Figure 8C:
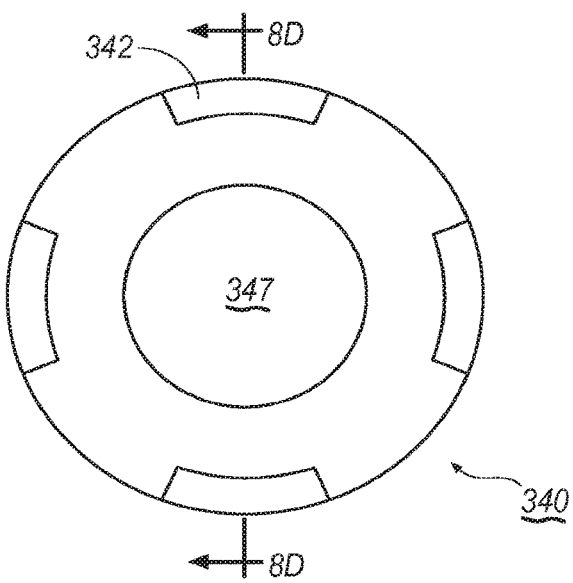
FIG. 8C is a first end view of the dog clutch from FIGS. 8A-8B.
Figure 8D:
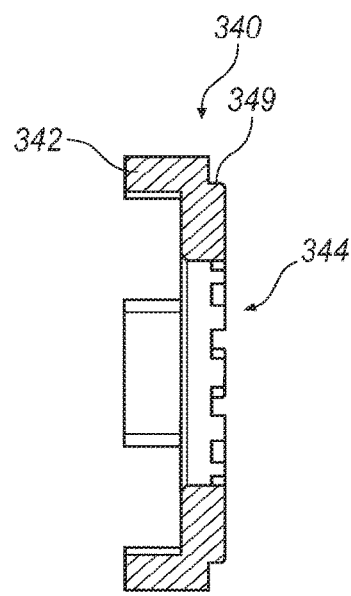
FIG. 8D is a cross-sectional view of the dog clutch taken along line 8D-8D in FIG. 8C.

Referring to FIGS. 8A-8D, details to dog clutch 340 will now be explained. Dog clutch 340 includes an engaging face 344, best seen in FIGS. 8B and 8D. Engaging face 344 includes a plurality of splines 345 that are configured to selectively engage with and mate with splines 321 formed on dog clutch thrust spline face 320. Dog clutch 340 further comprises an opening 347 through which input shaft 118 is received. Extending outwardly and away from engaging face 344 are one or more finger portions 342. Finger portions 342 are configured to be received within corresponding slots 338 formed in gear 308. While four finger portions 342 are depicted, it is understood that any number of finger portions 342 may be provided, so long as at least an equal number of slots 338 are provided. In one exemplary arrangement, finger portions 342 are spaced equi-distance from one another about dog clutch 340. As best seen in FIG. 8D, disposed about a periphery of the dog clutch 340 there is a mounting flange 349 is formed. Mounting flange 349 extends inwardly and is configured to partially support the return spring 341, to be discussed below.

Figure 4:
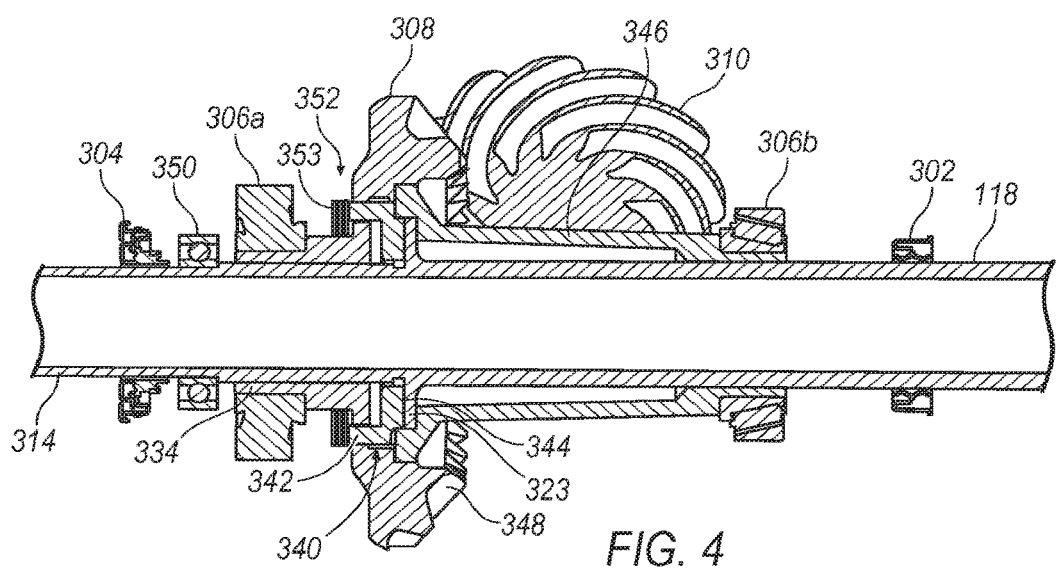
FIG. 4 is a side elevational view of the components of the power transfer unit with the straddle mount ring gear of FIG. 3 in an engaged mode.

Referring to FIGS. 4 and 5, input shaft 118 is positioned with second end 314 extending through shaft end 334 of drive ring gear 308 and dog clutch 340. Dog clutch 340 is positioned with drive ring gear 308 with finger portions 342 of dog clutch 340 extending through windows 338. Opposing engaging face 344 is oriented to face the dog clutch thrust face spline 320. As discussed above, engaging face 344 is configured with splines (best seen in FIG. 8B) that are configured to mate with the dog clutch thrust face spline 320. A transition portion 346 is positioned on a first side of dog clutch thrust face spline 320 so as to engage a mounting portion 348 (best seen in FIG. 7) of drive ring gear 308. The return spring 341 (best seen in FIG. 5) is positioned between the mounting flange 349 of dog clutch 340 and a face of the transition portion 346. In one exemplary arrangement, transition portion 346, drive ring gear 308, dog clutch thrust face spline 320 and input shaft 118 are provided as a weldment. However, it is understood that a bolted connection may also be employed.

Input/ring bearing 306B is mounted about transition portion 346. Mounted on shaft end 334 is input/ring bearing 306A. In one exemplary arrangement, input/ring bearing 306A is configured as a needle roller with a cage. A housing bearing 350 is mounted between input shaft dynamic lip seal 304 and input/ring bearing 306A.

An actuator assembly 352 is positioned so as to abut against finger portions 342 of dog clutch 340. In one exemplary arrangement, actuator assembly 352 comprises actuator thrust washers 353 positioned on either side of a thrust bearing. In the exemplary arrangement shown in FIGS. 4 and 5, the thrust bearing is configured as a needle roller with a cage.

Figure 9:
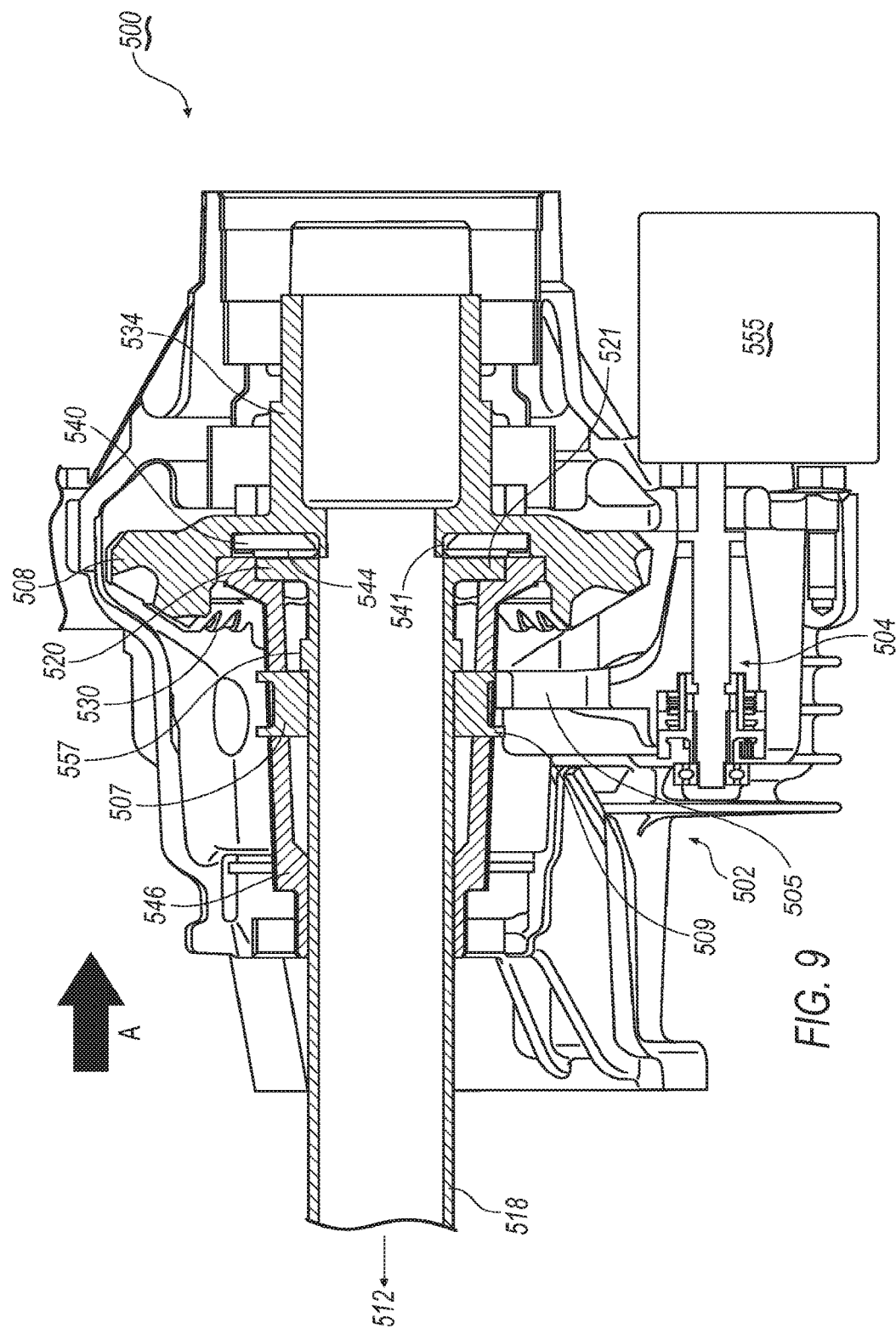
FIG. 9 is a cross-sectional view of an alternative arrangement of a power transfer unit illustrating an actuator mechanism between straddle mounted bearings

It is also contemplated that other actuator assemblies may be used with the PTU assembly 150. Indeed a variety of actuator assemblies may be employed to act against dog clutch 340, including, but not limited to, electromechanical actuators and shift fork mechanisms. For example, in one exemplary configuration, a shift fork that engages an axially slidable collar may be utilized to actuate dog clutch 340. An exemplary configuration of a shift fork arrangement is shown in FIG. 9.

Operation of the PTU assembly 150 will now be described. The PTU assembly 150 shown in FIG. 4 is in the engaged mode. In the engaged mode, the actuator assembly 352 pushes against the finger portions 342 of the dog clutch 340 that extend through the dog clutch windows 338. This action serves to axially move the dog clutch 340 within the drive ring gear 308 in an engaged direction and against the force of the return spring 341 until the engaging face 344 moves into engagement with the dog clutch face spline 320. Once so engaged, the drive ring gear 308, the driven pinion gear 310, and sliding dog clutch 340 (collectively, "the gear assembly") all rotate together, thereby transmitting torque to the rear wheels.

As may be seen in FIG. 5, when no force is applied to the actuator assembly 352, return spring 341 biases engaging face 344 of dog clutch 340 out of engagement with dog clutch face spline 320. Accordingly, when input shaft 118 rotates, the gear 308 will not rotate. Nor will bearing 306a, dog clutch 340, or transition portion 346 rotate. This PTU arrangement provides for an efficient mechanism for selectively disconnecting the input shaft 118 from rotating components to reduce drag, rotating mass and NVH. Indeed, this PTU arrangement reduces parasitic loss associated with rotating mass, gear mesh, seal drag, bearing drag and oil churning when not required to transfer torque.

Further, the PTU 150 arrangement disclosed herein, and more specifically, the straddle mounted bearings 306A-306B positioned on either side of the drive ring gear 308, along with the sliding dog clutch 340, serves to provide a rigid, robust and cost effective PTU assembly that is easy to assemble. Indeed, the straddle support of the ring gear 308 serves to increase the span between support bearings when compared to a traditional cantilever ring gear layout.

Further, the PTU 150 provides improved shaft sealing of mating drive spines on the input shaft 118 and pass through output shaft interface, namely by use of a continuous tubular input shaft 118. The input shaft sealing interface is much more robust as compared to conventional designs as the input shaft 118 and the transition member 346 are much less over-constrained and do not require tight tolerance machining between the input shaft and a link shaft interface.

Moreover, the sealing between the transmission PTU and the shaft interface is simplified in the arrangement depicted herein. More specifically, by arranging the disconnect mechanism (i.e., the dog clutch 340 and dog clutch face spline 320) between the saddle support, the total number of bearings required for the assembly are reduced as compared to conventional arrangements. Further the number of seals required for the input/ring gear axis is also reduced. Such an arrangement serves to reduce the overall mass of the assembly, as well as the drag when in both the engaged and disengaged positions.

While the above exemplary PTU assembly 150 has been depicted utilizing a dog clutch 340 that selectively engages with a dog clutch thrust face spline 320, it is understood that other clutching mechanisms may be employed without departing from the disclosure. For example, in one arrangement, a dog clutch 340 may be replaced with a synchronizer clutch. In another exemplary configuration, a sliding spline clutch may be used in place of the dog clutch arrangement, whereby splines formed on an axially slidable clutch ring received within the gear 308 are configured to engage mating splines formed on an opening extending through the drive gear ring 308. The actuator assembly is configured to slide the sliding spline clutch axially until an engaging face of the sliding spline cutch engages the clutch member secured to the input shaft 118. Thus, when the clutch ring and the clutch member 320 of the input shaft are engaged, torque is transmitted to the secondary drive unit 180.

While the actuator 352 is shown positioned on the left side of the gear 308 in FIGS. 4 and 5, it is understood that modifications may be made to the arrangement of various components such that actuator 352 may be positioned on the right side of the gear 308.

FIG. 9 illustrates an alternative arrangement of a PTU assembly 500. PTU assembly 500 includes an input shaft 518 which rotationally connects to a transmission (not shown). As in the embodiment shown above in FIGS. 3-8, input/ring bearings (not shown) are straddle mounted on either side of a drive ring gear 508. Input/ring bearings may be configured as tapered bearings, it is understood that other suitable bearings may be utilized, such as, for example, angular contact bearings.

Ring gear 508 includes a gear face portion 530 that includes a plurality of teeth formed on a first end thereof. A second end of drive ring gear 508 includes a shaft end 534. In one exemplary configuration, shaft end 534 is stepped. Mounted within drive ring gear 508 is a dog clutch 540 that includes a plurality of splines on an engagement face 544. Dog clutch 540 includes a central opening therethrough. The opening in dog clutch 540 is configured to receive a mounting protrusion 541 therethrough. While drive ring gear 308 is illustrated as a 90° hypoid gear, it is understood that other suitable gears may be employed. Such examples include, but not limited to bevel gears, beveloid, helical and spiral bevel gears. An intermediate member 546 is fixedly secured to the drive ring gear 508, such as by welding.

PTU 500 further includes a driven pinion gear (not shown) that operatively engages with drive ring gear 508. Like the previous embodiment, the driven pinion gear is fixedly connected to an output. As set forth above, the output serves to transmit torque to the secondary PTU or rear drive unit (RDU) 180 to drive wheels 144 through the propeller shaft 160. The driven pinion gear may be configured as a 90° hypoid gear, bevel, beveloid, helical or spiral bevel arrangements.

Input shaft 518 may be configured to be hollow, but generally defines a first end 512 and a second end. First end may be formed with a spline (not shown) to permit connection to the transmission 114. The second end terminates in a dog clutch thrust face spline 520 that is mounted about input shaft 518. In one exemplary configuration, the dog clutch thrust face spline 520 is integrally formed with the input shaft 518 so as to be rotationally fixed with the input shaft. However, other manners of rotationally fixing the dog clutch thrust face spline 520 to the input shaft 518 are also contemplated. Dog clutch thrust face spline 520 is configured with a plurality of splines on an engaging face 521 that are configured to mate with corresponding splines formed on engaging face 544 of dog clutch 540 such that, when dog clutch thrust face spline 520 is engaged with dog clutch 540, dog clutch 540 will rotate with input shaft 118. Further, because dog clutch 540 is fixedly engaged with drive ring gear 508, such engagement will cause drive ring gear 508 to rotate with the input shaft 518.

In the PTU assembly 500, an alternative actuator mechanism 502 is illustrated between the straddle mounted bearings. Actuator mechanism 502 includes a shift fork assembly 504. A shift fork 505 is engaged with a collar 507. The collar 507 is slidingly mounted on the input shaft 518. The input shaft 518 further includes an engagement hub 557 fixedly secured to the input shaft 518. The intermediate member 546 includes axially extending slots therein, through which fingers of 509 of the collar protrude.

As may be appreciated, the PTU assembly 500 is shown in a disengaged configuration. To place the PTU assembly 500 in the engaged configuration, a motor 555 activates the actuator assembly 502, thereby causing shift fork 505 to axially move the collar 507 in the direction of arrow A. Because collar 507 is slidingly engaged to input shaft 518, as the collar 507 slides over the input shaft 518, the collar 507 will contact the engagement hub 557, thereby causing the input shaft 518 to move in the direction A. Further, as the collar 507 moves in direction A, the fingers 509 slide within the slots of the intermediate member. The axial movement of the input shaft 518 causes the engaging face 521 of the dog clutch thrust face spline 520 to engage and mesh with the engaging face 544 of the dog clutch 540. Once engaged in this manner, rotation of the input shaft 518 causes drive ring gear 508 to rotate.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

The present disclosure has been particularly shown and described with reference to the foregoing illustrations, which are merely illustrative of the best modes for carrying out the disclosure. It should be understood by those skilled in the art that various alternatives to the illustrations of the disclosure described herein may be employed in practicing the disclosure without departing from the spirit and scope of the disclosure as defined in the following claims. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements. Moreover, the foregoing illustrations are illustrative, and no single feature or element is essential to all possible combinations that may be claimed in this or a later application.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "the," etc. should be read to recite one or more of the indicated elements unless a claim recites an explicit limitation to the contrary.

The invention claimed is:

1. A gear assembly for a power transfer unit assembly for a vehicle, comprising:
   an input shaft;
   a drive ring gear assembly along a common axis as the input shaft, the drive ring gear assembly having a gear face portion with a plurality of teeth, wherein the gear face portion and the plurality of teeth have an axial extent with respect to the common axis;
   a pair of input/ring bearings straddle mounted on either side of the drive ring gear;
   a first clutch member fixedly connected to the input shaft and positioned between the input/ring bearings;
   a driven pinion gear assembly operatively engaged with the drive ring gear;
   a second clutch member fixedly mounted to the drive ring gear, the second clutch member residing generally radially underneath the gear face portion of the drive ring gear assembly and residing generally axially within the axial extent of the gear face portion and the plurality of teeth; and
   an actuator assembly that operates to move the first clutch member into engagement with the second clutch member so as to cause the drive ring gear to rotate with the input shaft, thereby causing the driven pinion gear assembly to rotate.

2. The gear assembly of claim 1, further comprising a collar that slidingly connected to the input shaft, wherein the collar is operatively connected to a shift fork such that when the actuator assembly operates, the shift fork serves to move the input shaft into an engaged position whereby the first clutch member is engaged with the second clutch member so as to rotate the drive gear ring.

3. The gear assembly of claim 2, further comprising an intermediate member that is fixedly engaged to the drive gear ring, wherein the intermediate member further comprises slots through which a portion of the collar may extend.

4. The gear assembly of claim 2, wherein the input shaft is configured to be slidable with respect to the intermediate member.

5. The gear assembly of claim 2, wherein the first clutch member has an engaging face that further comprises a plurality of splines that are configured to engage and mate with corresponding splines on the second clutch member.

* * * * *